United States Patent [19]
Rudnev et al.

[11] 3,749,538
[45] July 31, 1973

[54] APPARATUS FOR MAKING HOLLOW MOULD CORES

[76] Inventors: Viktor Ivanovich Rudnev, oblasti, Novomytischinsky prospekt, 80, korpus 2, kv. 74, Mytischi Moskovskoi; Vladimir Ivanovich Rudnev, oblasti, proezd Vorovskogo, 7, kv. 47, Kaliningrad Moskovskoi, both of U.S.S.R.

[22] Filed: Apr. 20, 1971

[21] Appl. No.: 135,720

[52] U.S. Cl. ............... 425/261, 425/444, 425/438
[51] Int. Cl. ............................................. B28b 5/04
[58] Field of Search ................. 425/88, 161, 253, 425/261, 453, 455, 444, 438

[56] References Cited
UNITED STATES PATENTS

| | | | |
|---|---|---|---|
| 2,694,845 | 11/1954 | Montague | 425/261 |
| 3,431,598 | 3/1969 | Lueddeke et al. | 425/455 |
| 3,612,159 | 10/1971 | Galinsky | 425/455 X |

Primary Examiner—J. Spencer Overholser
Assistant Examiner—David S. Safran
Attorney—Waters, Roditi, Schwartz & Nissen

[57] ABSTRACT

An apparatus for making hollow mould cores from thermosetting mixtures having a core box provided with inserts limiting the thickness of the walls of the core. One of these inserts is placed onto the bottom of the box and consists of a disk with an opening coaxial to the opening in the bottom of the box, while the other, central insert, has a tail entering the opening in the bottom of the box through the opening in the disk to allow the central insert to be set coaxially to the box, in which case the drive bar is arranged in a vertical position and provided with two supports which during the movement of the bar upwards disconnect the inserts and set them at different levels by height. Arranged at the levels of the supports during the maximum protrusion of the bar are devices which during the back stroke of the bar remove the central insert and core from the bar supports and then transfer the central core into the core box.

7 Claims, 6 Drawing Figures

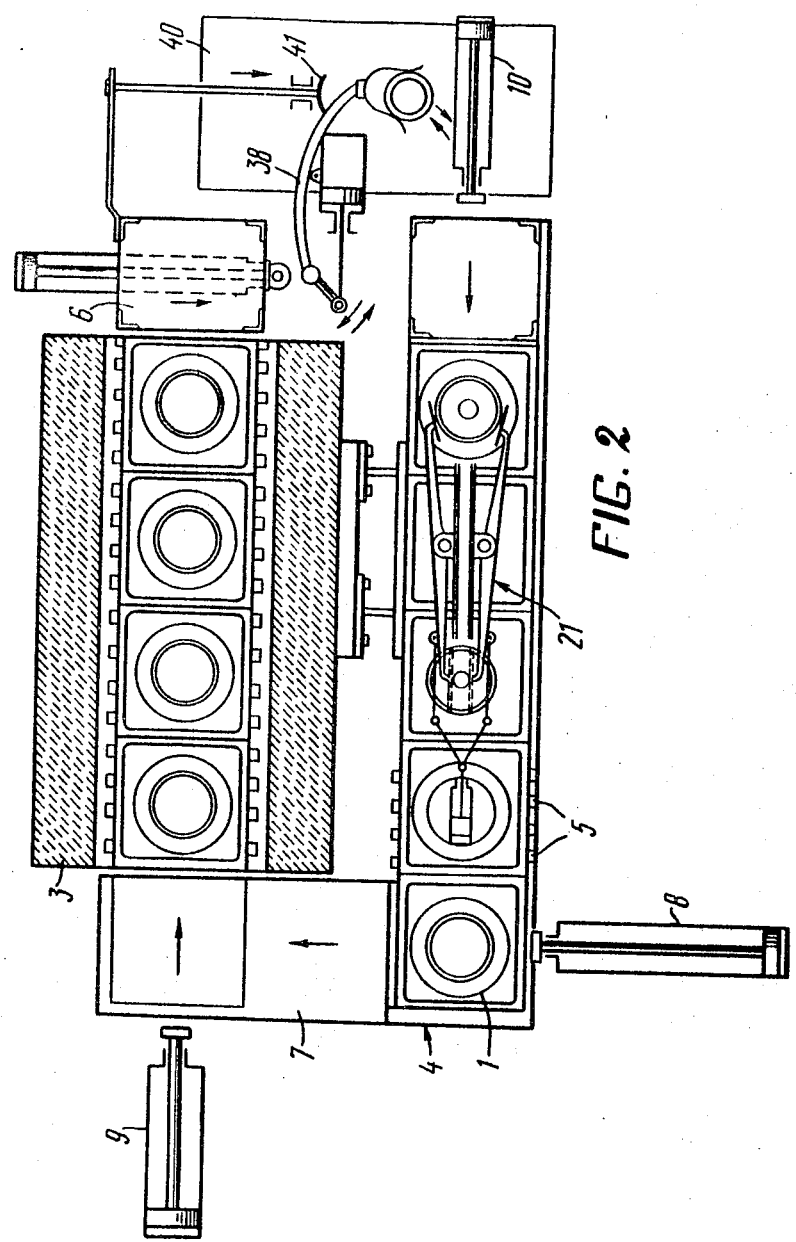

APPARATUS FOR MAKING HOLLOW MOULD CORES

The present invention relates to apparatus for making hollow mould cores from thermosetting mixtures, for example, for making bell-mouths of drain tubes. The proposed apparatus can also be successfully used for mass production of articles from plastic materials capable of solidifying in heated open moulds.

Well known in the present technique are single-stage apparatus for making cores from thermosetting mixtures by means of heated core boxes charged with a mixture from above, in which case the mixture fills the whole volume of the box. After polymerization of the mixture and development of the core envelope, the box is turned through 180°. The excess of the nonreacted mixture is poured out, the solidified core is withdrawn from the box and then the whole operating cycle is repeated. Such apparatus require constant attention of the operating personnel for servicing each box. Furthermore, such apparatus have low efficiency as the operator must wait for a definite time period needed for the polymerization and solidification of the mixture. Time is also needed for blowing and lubricating the box.

Also known in the art are apparatus for making hollow mould cores from thermosetting mixtures which are provided with a device for feeding the mixture into the core boxes, an oven for heating the core boxes, and a device for pushing out the cores from the box having a driving bar entering the opening in the box bottom and pushing the core therefrom, an insert with an opening coaxial to the opening in the box bottom being placed onto this bottom (cf. the USSR Author's Certificate No. 123674, cl. 31 $b$ $13^{08}$).

In these apparatus the core box is screwed on a rotary spindle. Heating electric coils are disposed around the box. A special batcher is used to feed a batch of the mixture into the rotary core box enclosed with a cover. Under the effect of the centrifugal force the mixture is distributed about the periphery of the box. After a certain period of time the rotary box is stopped and the cover is placed aside by a clamp. The bar extending through the spindle removes the core and disk from the box. The core is transferred to a conveyor, the bar returns to the initial position and places the disk onto the bottom of the box. The box is prepared for the next cycle (blowing, spraying with liquid) and the cycle is repeated.

However, when making the cores in this apparatus, the lower portion of the core has a higher thickness due to nonuniform distribution of the mixture within the box and this results in overconsumption of the mixture.

In addition, the known apparatus has a poor efficiency, because all operations of the technological process are effected by one stage in succession.

An object of the present invention is to provide such an apparatus for making hollow mould cores from thermosetting mixtures which would have a higher capacity than the known apparatus.

Another object of the invention is to provide such an apparatus which would minimize unnecessary consumption of labor and materials and would provide for automation of the technological process.

These and other objects are attained due to the fact that in the apparatus for making hollow mould cores of thermosetting mixtures having a device for feeding the mixture into the core boxes; an oven for heating the core boxes and a device for pushing-off the cores having a driving bar entering the opening in the box bottom to push the core therefrom, and a disk-shaped insert placed onto the box bottom and having an opening coaxial to the opening in said bottom, according to the invention, the box is provided with a central insert limiting the thickness of the core walls and having a tail entering the opening in the box bottom through the opening in the disk-shaped insert and positioning the central insert coaxially to the box, in which case the driving bar is arranged in a vertical position and has two supports, which during the movement of the driving bar upwards, disconnect the inserts and place them at different levels by height, the upper support being adapted for holding the central insert being pushed from the core, and the lower support being used for holding the core and disk in the process of pushing them from the box. According to the invention, located at the levels of the supports during maximum protrusion of the bar are devices which during the back stroke of the bar remove the central insert and the core from the bar supports and then transfer and lower the central insert into the core box.

The provision of the box with a central insert ensures a uniform thickness of the walls of the core, assists in rapid polymerization of the thermosetting mixture, reduces to minimum the consumption of this mixture, and makes it possible to automatize the process of disassembly and assembly of the core box and removal of the ready core from the apparatus.

It is expedient that the tail of the central insert should have a socket congruent to the shape of the upper support of the bar.

This allows the upper support of the bar to freely enter the socket of the tail and reliably hold the central insert during the lift of the bar.

The upper suport of the bar is preferably made in the form of a cone the lower support of the bar is preferably made in the form of a step having a diameter exceeding the maximum diameters of the upper support and of the opening of the disk.

At such a construction of the supports the operation of pushing out the ready core is combined with the operation of pushing out the insert of the box.

The device lowering the central insert into the core box is preferably made in the form of a vertically disposed driving bar provided with a support similar to the upper support of the bar of the device for pushing out the core from the box.

Such a construction of the apparatus provides for automatic assembly of the box.

The device for removing and transferrng the central insert is preferably made of two double-arm levers capable of turning in a horizontal plane some ends of the levers being disposed above the device for pushing out the cores and the other ends being disposed above the device lowering the central insert into the core box, and of two pairs of guides located one above the other between the levers, the lower pair of guides securing a slider with an aperture exceeding the size of the central insert, while the upper pair of guides being adapted for moving thereon the central inserts fed onto the guides through the aperture of the slider. The latter is provided with two supports located on both sides of the aperture along the upper pair of guides, one support is stationary and is used for moving the central insert along the upper guides, while the other support is chamfered and adapted for rotation in a vertical plane to move the insert disposed on the upper guide, in which case at the ends of the double-arm levers there are secured strips used for holding the central inserts prior the their movement along the upper guides and after this movement.

Such a construction of the device for removing and transferring the central insert makes it possible to dismantle the core box at the same time and in the same position and to assemble it on another position, in which case the time of making the cores is considerably reduced.

The device for removing and transferring the core is preferably made in the form of a rotary lever with a clamp at the end thereof and a stationary platform placed under this lever and equipped with a reciprocating pusher interacting with the core when the latter is being removed from the apparatus.

The clamp of the rotary lever may be made in the form of V-shaped flat spring.

Such a construction of the clamp provides for holding the ready hollow cores having various dimensions.

The proposed apparatus is featured by a high efficiency as the whole technological process of making the cores from thermosetting mixtures by means of this apparatus is divided into a number of short-term main and auxiliary operations effected simultaneously, in which case the idle strokes of the mechanisms are combined with the main operations of the process.

The apparatus is compact, has a simple construction, and is reliable and safe in operation.

Furthermore, the efficiency of the proposed apparatus is 4 to 5 times as high as that of the known apparatus and under real manufacturing conditions is equal to 150–180 cores per hour. The technical facilities of the apparatus provide for making 220–240 cores per hour, while the apparatus is run by one operator.

Other objects and advantages of the pproposed invention will be apparent from the following detailed description of one particular embodiment of the invention, reference being made to the accompanying drawings, in which.

Figure 1:
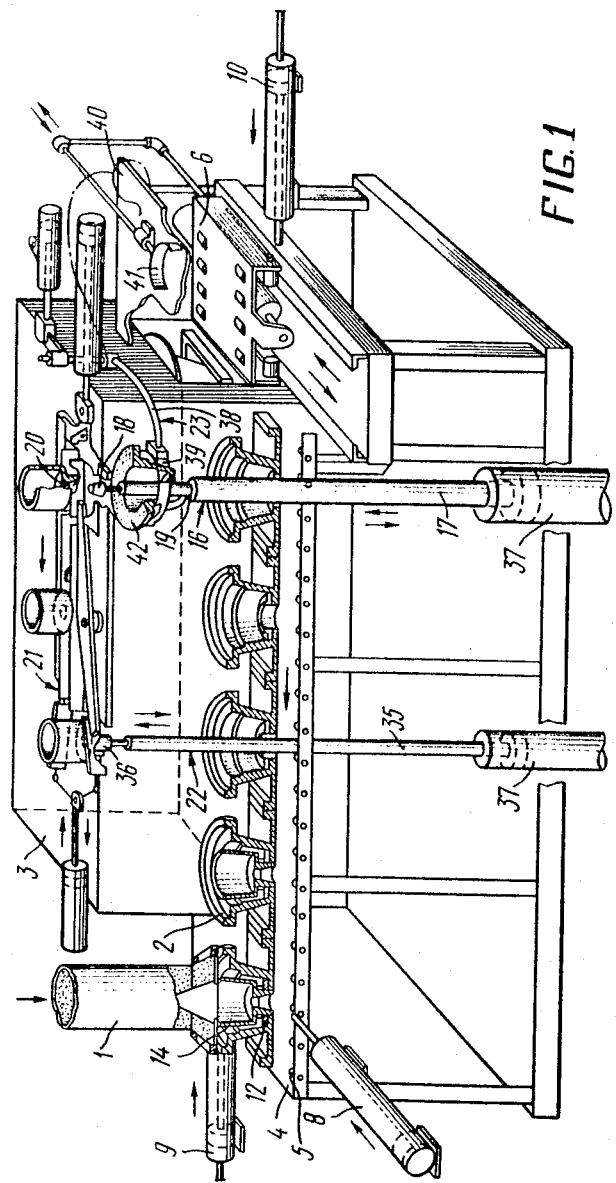
FIG. 1 is a general isometrical view, partly in section, of the apparatus for making hollow mould cores according to the invention.
Figure 2:
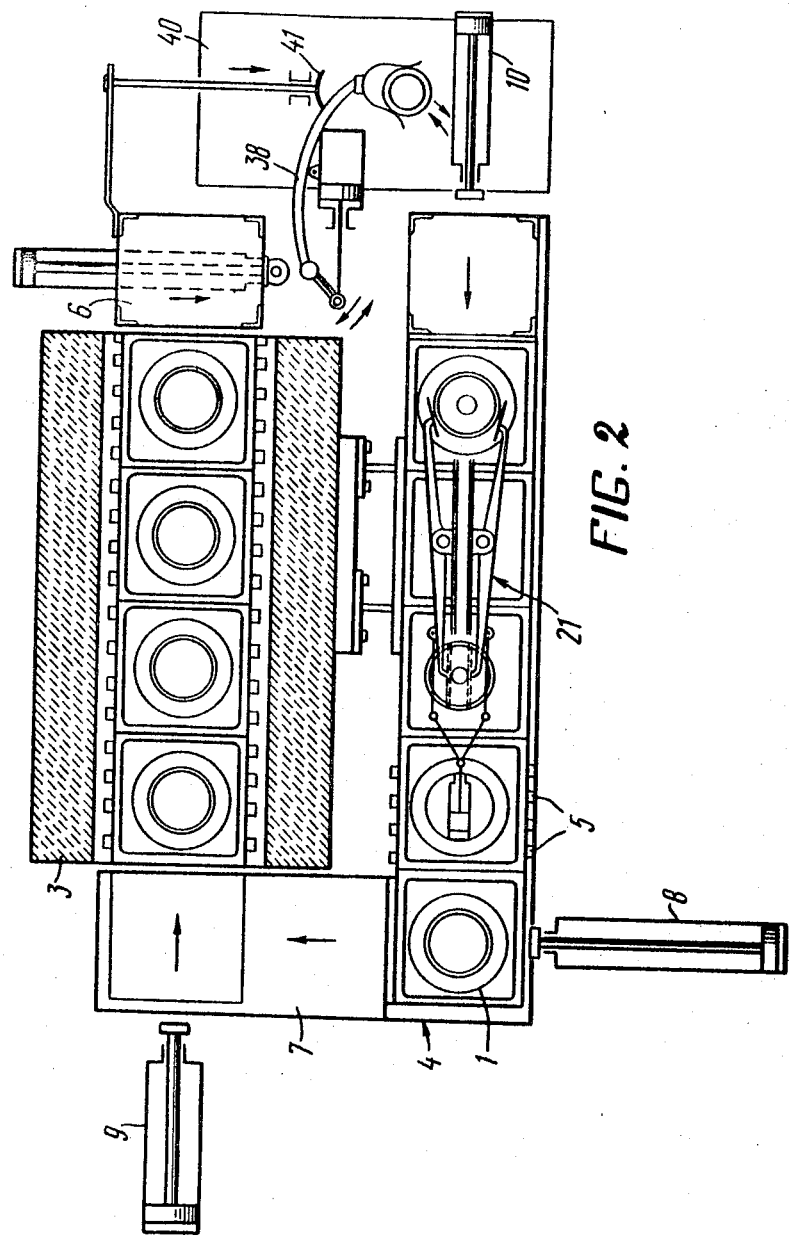
FIG. 2 is a plan view of the same.

The apparatus for making hollow mould cores from thermosetting mixtures has a device 1 (FIG. 1) for feeding the mixture into core boxes 2 and an oven 3 for heating the core boxes. To transfer the core boxes 2 from the device 1 through the oven 3 and back to the device 1, there is provided a device 4 for transferring the core boxes 2. This device 4 consists of two parallel rows of roll tables 5 disposed in a horizontal plane and closed at one side by a drive carriage 6 and at the other side by a stationary platform 7 (FIG. 2).

The device 4 is arranged so that the first row of roll tables 5 is passed through the oven 3, wile the second row is disposed in parallel to the oven and under the device 1 for feeding the mixture.

The carriage 6 moves perpendicular to the direction of movement of the boxes 2 along the roll tables 5.

Mounted somewhat above the level of the roll tables 5 are three pushers 8, 9 and 10, two of them, namely 8 and 9, are arranged normal to each other near the device 1 for feeding the mixture. In this case the pusher 8 is used for moving the core box 2 from the second row of the roll tables 5 along the stationary platform 7 from the mixture feeding device 1 to the oven, whereas the pusher 9 is used for moving the core box 2 into the oven 3. The pusher 10 is located near the second row of the roll tables 5, along this row, and is used for moving the core box 2 from the carriage 6 onto the second row of the roll tables.

Figure 3:
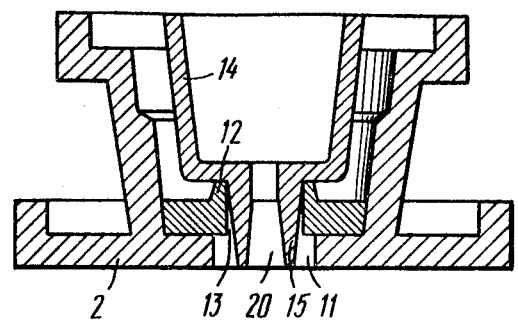
FIG. 3 is a longitudinal section of the assembled core box mounted in the proposed apparatus.
Figure 4:
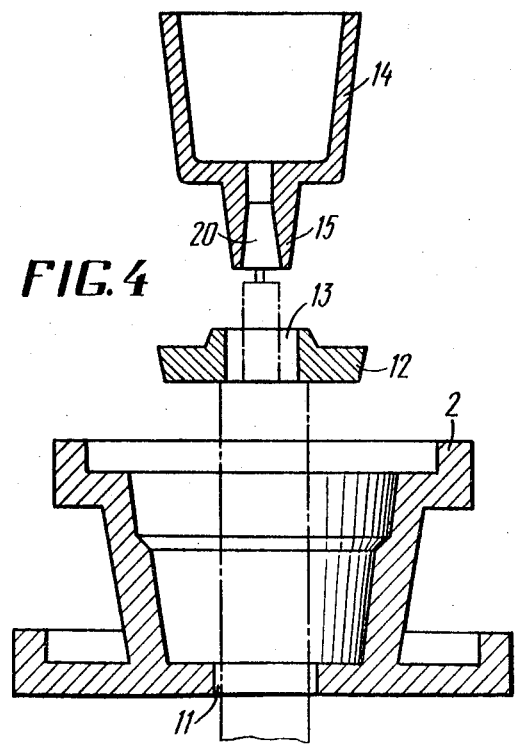
FIG. 4 is a view of the disassembled unit shown in FIG. 3.

The core box 2 (FIGS. 3 and 4) is provided with inserts limiting the thickness of the walls of the core, one of the inserts being placed on the bottom of the core having an opening 11. This insert is shaped as a disk 12 having an opening 13 coaxial with the opening 11 of the box 2. The other insert is a central insert 14 and has a tail 15 which during the assembly of the box extends through the opening 13 of the disk 12 and enters the opening 11 of the box 2 to set the insert 14 coaxially to the box 2. Such a construction of the box provides for uniform thickness of the walls of the core and makes it possible to accelerate the polymerization of the thermosetting mixture and to minimize the consumption of this mixture.

Figure 6:
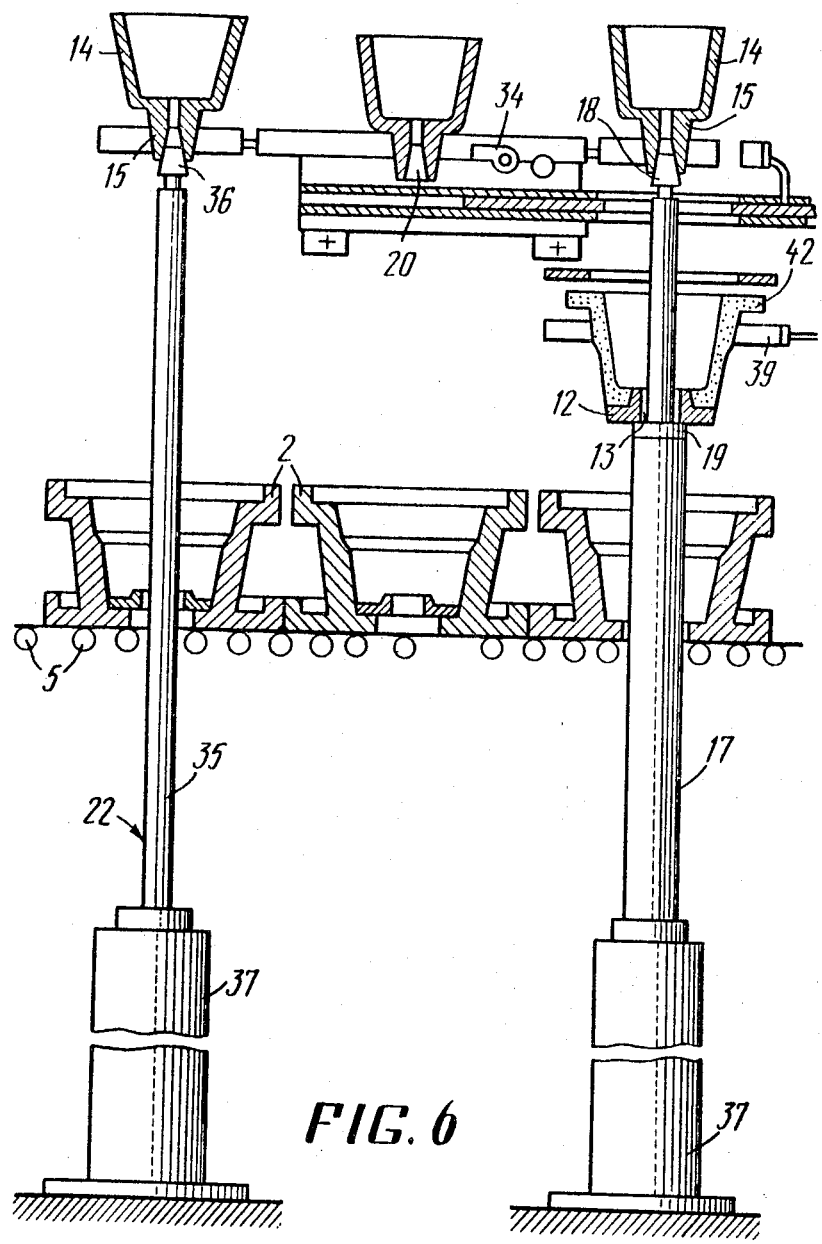
FIG. 6 shows the device for pushing out the cores and the device lowering the insert into the core box at the moment of interaction with the device for removing and transferring the inserts.

Located under the second row of the roll tables 5 (FIG. 1) is a device 16 for pushing the cores from the box comprising a vertical drive bar 17 (FIG. 6) loosely extended between the roll tables. The bar 17 is provided with two supports 18 and 19 which in the process of lifting the bar disconnect the inserts 12 and 14 and place them at different levels by height. Thus, the upper support 18 is adapted for holding the central insert 14 being pushed out from the core, while the lower support 19 is used for holding the disk 12 and the core being pushed out from the box 2.

The support 18 is made as a cone, while the lower support 19 is shaped as a step having a diameter exceeding the maximum diameter of the upper support 18 and the maximum diameter of the opening 13 of the disk 12. The tail 15 of the central insert 14 has a socket 2 (FIG. 4) corresponding to the shape of the upper support 18 of the bar 17.

During the maximum protrusion of the bar 17, at the levels of disposition of the supports 18 and 19 there are disposed, respectively, a device 21 (FIG.1) for removing the central insert 14 from the support 18 and transferring it to the device 22 lowering the central insert into the core box, and a device 23 for removing and transferring the core.

The device 21 for removing and transferring the central insert is disposed above the second row of roll tables 5 and is made of two double-arm levers 24 (FIG.5) rotatable in a horizontal plane and two pairs of guides 25 and 26 disposed between the levers 24 one above the other. The levers 24 are placed so that some of their ends are disposed above the device 16 for pushing out the cores, while the other ends are disposed above the device 22 lowering the central insert into the core box, the ends of the double-arm levers mounting the strips 27 used for holding the inserts 14. In this case the double-arm levers 24 are provided with a pneumatic drive rotating these levers in a horizontal plane.

Disposed in the lower pair of the guides 26 is a slider 28 provided with a pneumatic drive 29. The slider 28 has an aperture 30 the size of which exceeds the size of the central insert 14. The upper pair of the guides 25 is adapted for moving therealong the inserts 14 fed onto the guides through the aperture 30 of the slider 28. In this case the slider 28 is provided with supports 31 and 32 disposed on both sides of the aperture 30 along the upper pair of the guides 25.

The support 31 is stationary and is used for moving the insert 14 along the guides 25, while the support 32 is mounted on an axle 33 with a possibility of rotation about this axle and is used for moving the other inserts disposed on the guides 25. The support 32 has a chamfer 34 which allows the support 32 to run loosely under the tail 15 of the insert 14 disposed on the guides 25 during the back stroke of the slider 28 and to rotate about the axle 33.

The mechanism 22 (FIG.1) lowering the central insert into the core box is disposed under the second row of the roll tables 5 and consists of a vertical drive bar 35 with a support 36 similar to the support 18. A pneumatic drive 37 actuates the bars 35 and 17.

The mechanism 23 for removing and transferring the core comprises a rotary lever 38 with a clamp 39 at the end of this lever made in the form of V-shaped flat spring and a stationary platform 40 disposed under the rotary lever 38 carrying a reciprocating pusher 41. The latter is secured on the carriage 6 and interacts with a core 42 being withdrawn from the apparatus.

The apparatus is controlled through a control desk and limit switches (not shown) sending a signal to automatically operate the devices 1, 21, 22, 23. The direction of movement of the boxes in the apparatus is shown in Figures by arrows.

The proposed apparatus operates as follows:

The preheated core boxes 2 (FIG. 1,2) carrying the inserts 12 and 14 are placed on the roll tables 5 in immediate contact with each other.

The core box 2 which is under the device 1 is pressed against the head of this device and a thermosetting mixture is forced into the space limited by the walls of the box and the central insert 14. After filling the box 2 with the mixture, the box is lowered onto the roll table 5. At this moment, the drive of the pusher 8 operates and the pusher 8 moves the box 2 filled with the mixture to the oven, while the pusher 9 moves the box 2 into the oven 3 where the mixture solidifies. In this case the time required for the polymerization of the mixture and for the formation of a core depends on the quality of the mixture and the thickness of the core. The boxes with the ready cores 42 are pushed out from the oven 3 by the next box which is fed into the oven after filling it with the mixture. The box 2 with the ready core 42 is pushed onto the carriage 6. At this time the drive of the carriage 6 is operated and the carriage runs to the second row of the roll tables 5. When the carriage 6 stops, the pusher 10 operates and transfers the box from the carriage onto the second row of the roll tables. As soon as the box 2 with the ready core 42 occupies the position above the device 16 for pushing out the cores, the drive 37 of the bar 17 operates. When the bar 17 moves upwards, its support 18 enters the socket 20 of the insert 14 and removes it from the core 42, whereas the lower support 19 bears upon the disk 12 and lifts it together with the core 42. Thus, during a single lift the bars are removed from the core bos, and the central insert 14 and the disk-shaped insert 12 with the core 42 are disconnected and placed at different levels by height.

When the bar 17 is moved to a maximum extent, the central insert 14 (FIG.5) passes into the aperture 30 of the slider 28 and ocuppies such a position that the tail 15 is placed at the level of the support 31 of the slider 28. At this time the drive for rotation of the double-arm levers 24 and the drive of the rotary lever 38 (FIG.1) operate. The double-arm levers 24 rotate in a horizontal plane so that their ends, which are located above the bar 17, approach each other, whereas the ends located above the bar 35 separate. The strips 27, which are mounted on the ends of the double-arm levers 24, hold the tail 15 of the central insert 14 while the clamp 39 of the rotary lever 38 clamps the core 42.

Figure 5:
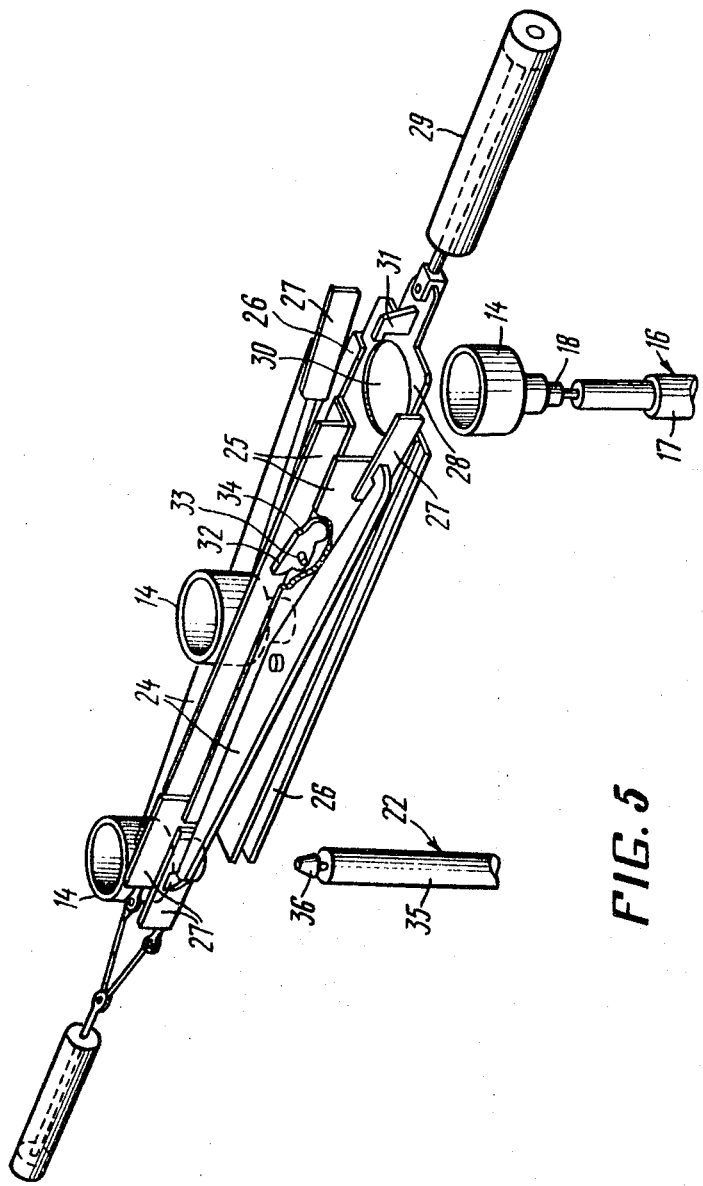
FIG. 5 is an axonometric view of the device for removing and transferring the central insert in the apparatus.

After that, the drive for back movement of the bar 17 is switched on and, as soon as the upper support 18 leaves the socket 20 of the tail 15, the drive 29 operates and drives the slider 28 (FIG.5). The latter moves along the lower guides 26, while the stationary support 31 bearing against the tail 15 moves the central insert 14, first along the strips 27, which are arranged so that when the ends of the double-arm levers 24 are disposed close to each other, they serve as an extension of the upper pair of guides, and then moves the central insert 14 along the guides.

During the back stroke of the slider the movable support 32 has its chamfer 34 moving under the central insert, which makes the support 32 of rotate about the axle 33 and to freely pass under the central insert 14.

When the bar 17 return to the initial position, the core 42 (FIG.1) is held by the clamp 39. As soon as the upper support 18 moves from the core 42, the drive of the rotary lever 38 operates and the latter returns to the initial position moving above the stationary platform 40 (FIG.2 ). The core 42 bears upon the pusher 41 located under the platform 40. At this moment the next core is pushed onto the carriage 6 from the oven 3. The carriage, while moving in the direction perpendicular to the direction of the core boxes in the oven, shifts the pusher 41 which transfers the ready core 42 along th stationary platform 40 and throws it into the bunker. In the process of movement of the carriage 6 the bar 17 completely returns to the initial position and lowers the disk 12 onto the bottom of the box 2. During the next cycles of lifting the bar 17 the above-described operations are repeated.

When the support 31 (FIG.5) moves the next central insert, the central insert located on the guides 25 is transferred by the movable support 32 and is stopped above the bar 35. In this case the bars 17 and 35 are lifted simultaneously. As soon as the central insert 14 moved by the stationary support 31 comes from the strips 27 of the double-arm levers 24 onto the guides 25, the levers 24 rotate so that their ends disposed above the bar 17 separate for taking the next central insert, whereas the ends disposed above the bar 35 come close to each other and hold the central insert above the bar 35. At this time the support 36 of the bar 35 enters the socket 20 of the tail 15, while the folowing central insert 14 passes through the aperture 30 of the slider 28. The double-arm levers 24 rotates again and their strips 27 hold the central insert disposed on the support 18 of the bar 17, while the strips 27 secured on the opposite ends of the levers 24 separate, thereby releasing the central insert.

The lowering of the bars 17 and 35 is also effected simultaneously, in which case the bar 17 lowers the disk 12 into the core box and the bar 35 lowers the central insert 14 into the box, the tail 15 (FIG.3) of the insert 14 entering the opening 11 of the bottom of the box 2 through the opening 13 of the disk 12 and centring the insert 14 relative to the box.

During the lowering of both bars 17 (FIG.1) and 35, the core box 2 is filled with the mixture and is moved into the oven 3, thereafter, the box with the ready core is pushed out from the oven 3.

The operation of pushing the core 42 from the core box 2 is combined with the movement of the central insert 14 and the disk 12. Simultaneously, the bar 35 is moved upwards for removing the central insert 14 and subsequently placing it into the core box 2.

The operation of movement of the ready core 42 is combined with the operation of movement of the central insert 14 along the upper guides 25.

The operation of transferring the carriage 6 with the box 2 removed from the oven 3 is combined with the operation of removing the ready core 42 from the apparatus.

The operation of transferring the core box 2 to the device for pushing the core therefrom is combined with the operation of moving the core box to the position of feeding the mixture into the core box.

Thus, high efficiency of the apparatus is provided due to the combination of the technological operations in a due course of time.

We claim:

1. An apparatus for making hollow mold cores from thermosetting mixtures, comprising: core boxes having openings in their bottoms; a device to feed a thermosetting mixture into said boxes; an oven for heating said boxes filled with the mixture, said oven being disposed near said feeding device; a device for transporting said boxes from said feeding device through said oven, and back toward said feeding device, including two parallel rows of roll tables disposed in a horizontal plane and closed at one side by a driving carriage, and at the other side by a stationary platform, while the first row of tables passes through said oven, and the second row of tables passes under said feeding device and parallel to said oven; inserts placed on the bottoms of said boxes and made in the form of discs having openings coaxial to said openings in the box bottoms; a central insert for said boxes which in conjunction with said inserts is used to limit the thickness of the walls of the cores; a tail of said central insert entering said openings of the boxes through said openings of the discs, said tail adjusting said central insert coaxially to said boxes; a device for pushing out the cores from said boxes, arranged under said second row of tables and made in the form of a vertical bar loosely passing between said roll tables of said second row and entering said openings in the box bottoms to push the cores and said inserts therefrom; a drive for said bar for the displcement thereof and pushing the same from the cores and said boxes; supports arranged on said bar for disconnection of said inserts during the movement of said bar upward, and for placing them at different levels by height, the upper support of the bar holding said central insert, being pushed out from the cores, and the lower support of the bar holding the cores and said discs in the process of pushing them out from said boxes; a mechanism lowering said central insert into said boxes and located under said second row of tables; a device for removing said central insert from said upper support during the back movement of the latter, said removing device being disposed under said second row of tables at the level of said upper support during the maximum protrusion of said bar and transferring said central insert to said lowering mechanism; and a mechanism for removing and transporting the cores during said back movement of the bar, said removing mechanism being disposed at the level of said lower support during said maxiumum protrusion of the latter.

2. The apparatus as defined in claim 1, wherein said tail of the central insert has a conical socket congruent to the shape of said upper support of the pushing device.

3. The apparatus as defined in claim 2, wherein said upper support of the pushing device is made in the form of a cone while said lower support is made in the form of a step having a diameter exceeding the maximum diameter of said upper support and said openings of the discs.

4. The apparatus as defined in claim 1, wherein said removing device is made of two double-arm levers rotatable in a horizontal plane, some ends of said levers being disposed above said pushing device, and the other ends of the same being disposed above said lowering mechanism, and two pairs of guides disposed between said levers, one above the other, the lower pair of guides accommodating a slider with an aperature exceeding in size said central insert while the upper pair of guides moves therealong said central insert fed onto them through said aperture of the slider, in which case the latter is provided with two supports arranged at both sides of said aperture along said upper guides, one of said supports being a stationary support which is used for transferring said central insert along said upper guides while the other support has a chamfer for rotating in a vertical plane, for transferring another center insert disposed on said upper guides, in which case strips are secured on the ends of said levers for holding said central inserts before the movement thereof along said upper guides and after this movement.

5. The apparatus as defined in claim 1, wherein said lowering mechanism includes a vertical drive bar provided with a support similar to said upper support of the pushing device.

6. The apparatus as defined in claim 1, wherein said removing mechanism includes a rotary lever with a clamp at the end thereof, and a stationary platform disposed below said lever and carrying a reciprocating pusher which interacts with the cores being removed from the apparatus.

7. The apparatus as defined in claim 6, wherein said clamp consists of a flat spring having a substantially V-shape.

* * * * *